(12) United States Patent
Rothstein

(10) Patent No.: US 9,225,479 B1
(45) Date of Patent: Dec. 29, 2015

(54) PROTOCOL-CONFIGURABLE TRANSACTION PROCESSING

(75) Inventor: Jesse A. Rothstein, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/615,007

(22) Filed: Sep. 13, 2012

Related U.S. Application Data

(63) Continuation of application No. 11/243,844, filed on Oct. 5, 2005, now Pat. No. 8,533,308.

(60) Provisional application No. 60/707,856, filed on Aug. 12, 2005.

(51) Int. Cl.
*G06F 15/173* (2006.01)
*H04L 5/00* (2006.01)
*H04L 29/06* (2006.01)

(52) U.S. Cl.
CPC ............ *H04L 5/00* (2013.01); *H04L 29/06163* (2013.01)

(58) Field of Classification Search
CPC ....... H04L 45/00; H04L 5/0001; H04L 1/244; H04L 29/06068; H04L 29/06088; H04L 29/06163
USPC .......................................................... 709/223
See application file for complete search history.

(56) References Cited

U.S. PATENT DOCUMENTS

| 3,689,872 A | 9/1972 | Sieracki |
| 3,768,726 A | 10/1973 | Hale et al. |
| 4,021,782 A | 5/1977 | Hoerning |
| 4,054,951 A | 10/1977 | Jackson et al. |
| 4,316,222 A | 2/1982 | Subramaniam |
| 4,386,416 A | 5/1983 | Giltner et al. |
| 4,593,324 A | 6/1986 | Ohkubo et al. |
| 4,626,829 A | 12/1986 | Hauck |
| 4,701,745 A | 10/1987 | Waterworth |
| 4,862,167 A | 8/1989 | Copeland, III |

(Continued)

OTHER PUBLICATIONS

"BIG-IP Controller With Exclusive OneConnect Content Switching Feature Provides a Breakthrough System for Maximizing Server and Network Performance," F5 Networks, Inc., Press Release, May 8, 2001, accessed Jun. 4, 2002, 3 pages.

(Continued)

*Primary Examiner* — Peter Shaw
(74) *Attorney, Agent, or Firm* — John W. Branch; Lowe Graham Jones PLLC

(57) ABSTRACT

A traffic management device or other intermediate network device is configured to enable the device to support connection splitting and/or connection aggregation or to otherwise process network transactions for an arbitrary transaction-oriented protocol. The configuration may be accomplished by providing one or more traffic management rules defined by way of a scripting language and provided to an interpreter. The traffic management rule may follow a basic approach common to many protocols and is adapted to the particular protocol being supported. The rule may configure the network device to inspect incoming data, extract length and record type specifiers, buffer an appropriate amount of data to determine transactions or transaction boundaries, and perform other operations. Transaction processing may be enabled for various kinds of protocols, including application-level, proprietary, quasi-proprietary, and special-purpose protocols, protocols for which limited information is available, and protocols not natively supported by the network device.

20 Claims, 8 Drawing Sheets

(56) References Cited

U.S. PATENT DOCUMENTS

| | | | |
|---|---|---|---|
| 4,876,541 A | 10/1989 | Storer | |
| 4,890,282 A | 12/1989 | Lambert et al. | |
| 4,897,717 A | 1/1990 | Hamilton et al. | |
| 4,906,991 A | 3/1990 | Fiala et al. | |
| 4,971,407 A | 11/1990 | Hoffman | |
| 4,988,998 A | 1/1991 | O'Brien | |
| 5,003,307 A | 3/1991 | Whiting et al. | |
| 5,016,009 A | 5/1991 | Whiting et al. | |
| 5,063,523 A * | 11/1991 | Vrenjak | 709/223 |
| 5,109,433 A | 4/1992 | Notenboom | |
| 5,126,739 A | 6/1992 | Whiting et al. | |
| 5,146,221 A | 9/1992 | Whiting et al. | |
| 5,150,430 A | 9/1992 | Chu | |
| 5,155,484 A | 10/1992 | Chambers, IV | |
| 5,167,034 A | 11/1992 | MacLean, Jr. et al. | |
| 5,212,742 A | 5/1993 | Normile et al. | |
| 5,249,053 A | 9/1993 | Jain | |
| 5,280,600 A | 1/1994 | Van Maren et al. | |
| 5,293,388 A | 3/1994 | Monroe et al. | |
| 5,319,638 A | 6/1994 | Lin | |
| 5,341,440 A | 8/1994 | Earl et al. | |
| 5,367,629 A | 11/1994 | Chu et al. | |
| 5,379,036 A | 1/1995 | Storer | |
| 5,410,671 A | 4/1995 | Elgamal et al. | |
| 5,414,425 A | 5/1995 | Whiting et al. | |
| 5,463,390 A | 10/1995 | Whiting et al. | |
| 5,479,587 A | 12/1995 | Campbell et al. | |
| 5,488,364 A | 1/1996 | Cole | |
| 5,504,842 A | 4/1996 | Gentile | |
| 5,506,944 A | 4/1996 | Gentile | |
| 5,539,865 A | 7/1996 | Gentile | |
| 5,542,031 A | 7/1996 | Douglass et al. | |
| 5,544,290 A | 8/1996 | Gentile | |
| 5,546,395 A | 8/1996 | Sharma et al. | |
| 5,546,475 A | 8/1996 | Bolle et al. | |
| 5,553,160 A | 9/1996 | Dawson | |
| 5,553,242 A | 9/1996 | Russell et al. | |
| 5,610,905 A | 3/1997 | Murthy et al. | |
| 5,615,287 A | 3/1997 | Fu et al. | |
| 5,638,498 A | 6/1997 | Tyler et al. | |
| 5,768,445 A | 6/1998 | Troeller et al. | |
| 5,768,525 A | 6/1998 | Kralowetz et al. | |
| 5,774,715 A | 6/1998 | Madany et al. | |
| 5,805,932 A | 9/1998 | Kawashima et al. | |
| 5,825,890 A | 10/1998 | Elgamal et al. | |
| 5,850,565 A | 12/1998 | Wightman | |
| 5,874,907 A | 2/1999 | Craft | |
| 5,884,269 A | 3/1999 | Cellier et al. | |
| 5,892,847 A | 4/1999 | Johnson | |
| 5,898,837 A | 4/1999 | Guttman et al. | |
| 5,941,988 A | 8/1999 | Bhagwat et al. | |
| 5,951,623 A | 9/1999 | Reynar et al. | |
| 5,991,515 A | 11/1999 | Fall et al. | |
| 6,023,722 A | 2/2000 | Colyer | |
| 6,052,785 A | 4/2000 | Lin et al. | |
| 6,061,454 A | 5/2000 | Malik et al. | |
| 6,070,179 A | 5/2000 | Craft | |
| 6,182,139 B1 | 1/2001 | Brendel | |
| 6,185,221 B1 * | 2/2001 | Aybay | 370/412 |
| 6,223,287 B1 | 4/2001 | Douglas et al. | |
| 6,226,687 B1 | 5/2001 | Harriman et al. | |
| 6,253,226 B1 | 6/2001 | Chidambaran et al. | |
| 6,298,380 B1 | 10/2001 | Coile et al. | |
| 6,367,009 B1 | 4/2002 | Davis et al. | |
| 6,370,584 B1 | 4/2002 | Bestavros et al. | |
| 6,411,986 B1 | 6/2002 | Susai et al. | |
| 6,434,618 B1 | 8/2002 | Cohen et al. | |
| 6,452,915 B1 | 9/2002 | Jorgensen | |
| 6,584,567 B1 | 6/2003 | Bellwood et al. | |
| 6,590,588 B2 | 7/2003 | Lincke et al. | |
| 6,590,885 B1 | 7/2003 | Jorgensen | |
| 6,594,246 B1 | 7/2003 | Jorgensen | |
| 6,625,150 B1 | 9/2003 | Yu | |
| 6,628,629 B1 | 9/2003 | Jorgensen | |
| 6,629,163 B1 | 9/2003 | Balassanian | |
| 6,633,835 B1 | 10/2003 | Moran et al. | |
| 6,643,259 B1 | 11/2003 | Borella et al. | |
| 6,643,701 B1 | 11/2003 | Aziz et al. | |
| 6,650,640 B1 | 11/2003 | Muller et al. | |
| 6,654,701 B2 | 11/2003 | Hatley | |
| 6,665,725 B1 | 12/2003 | Dietz et al. | |
| 6,668,327 B1 | 12/2003 | Prabandham et al. | |
| 6,674,717 B1 | 1/2004 | Duong-van et al. | |
| 6,681,327 B1 | 1/2004 | Jardin | |
| 6,697,363 B1 | 2/2004 | Carr | |
| 6,718,388 B1 | 4/2004 | Yarborough et al. | |
| 6,754,662 B1 | 6/2004 | Li | |
| 6,754,831 B2 | 6/2004 | Brownell | |
| 6,760,782 B1 | 7/2004 | Swales | |
| 6,763,384 B1 | 7/2004 | Gupta et al. | |
| 6,766,373 B1 | 7/2004 | Beadle et al. | |
| 6,768,716 B1 | 7/2004 | Abel et al. | |
| 6,768,726 B2 | 7/2004 | Dorenbosch et al. | |
| 6,789,203 B1 | 9/2004 | Belissent | |
| 6,792,461 B1 | 9/2004 | Hericourt | |
| 6,798,743 B1 | 9/2004 | Ma et al. | |
| 6,799,276 B1 | 9/2004 | Belissent | |
| 6,829,238 B2 | 12/2004 | Tokuyo et al. | |
| 6,831,923 B1 | 12/2004 | Laor et al. | |
| 6,842,462 B1 | 1/2005 | Ramjee et al. | |
| 6,842,860 B1 | 1/2005 | Branstad et al. | |
| 6,845,449 B1 | 1/2005 | Carman et al. | |
| 6,854,117 B1 | 2/2005 | Roberts | |
| 6,895,443 B2 | 5/2005 | Aiken | |
| 6,928,082 B2 | 8/2005 | Liu et al. | |
| 6,934,260 B1 | 8/2005 | Kanuri | |
| 6,934,848 B1 | 8/2005 | King et al. | |
| 6,950,434 B1 | 9/2005 | Viswanath et al. | |
| 6,954,462 B1 | 10/2005 | Chu et al. | |
| 6,954,780 B2 | 10/2005 | Susai et al. | |
| 6,957,272 B2 | 10/2005 | Tallegas et al. | |
| 6,990,592 B2 | 1/2006 | Richmond et al. | |
| 7,013,338 B1 * | 3/2006 | Nag et al. | 709/226 |
| 7,013,342 B2 | 3/2006 | Riddle | |
| 7,023,804 B1 | 4/2006 | Younes et al. | |
| 7,047,315 B1 | 5/2006 | Srivastava | |
| 7,051,330 B1 | 5/2006 | Kaler et al. | |
| 7,068,640 B2 | 6/2006 | Kakemizu et al. | |
| 7,069,438 B2 | 6/2006 | Balabine et al. | |
| 7,092,727 B1 | 8/2006 | Li et al. | |
| 7,103,045 B2 | 9/2006 | Lavigne et al. | |
| 7,113,993 B1 | 9/2006 | Cappiello et al. | |
| 7,127,524 B1 | 10/2006 | Renda et al. | |
| 7,139,792 B1 | 11/2006 | Mishra et al. | |
| 7,139,811 B2 | 11/2006 | Lev Ran et al. | |
| 7,177,311 B1 | 2/2007 | Hussain et al. | |
| 7,181,493 B2 | 2/2007 | English et al. | |
| 7,185,360 B1 | 2/2007 | Anton et al. | |
| 7,215,637 B1 | 5/2007 | Ferguson et al. | |
| 7,231,445 B1 | 6/2007 | Aweya et al. | |
| 7,231,657 B2 | 6/2007 | Honarvar et al. | |
| 7,251,218 B2 | 7/2007 | Jorgensen | |
| 7,254,639 B1 | 8/2007 | Siegel et al. | |
| 7,266,613 B1 | 9/2007 | Brown et al. | |
| 7,272,651 B1 | 9/2007 | Bolding et al. | |
| 7,280,471 B2 | 10/2007 | Rajagopal et al. | |
| 7,287,077 B2 | 10/2007 | Haugh et al. | |
| 7,287,082 B1 * | 10/2007 | O'Toole, Jr. | 709/228 |
| 7,313,627 B1 | 12/2007 | Noble | |
| 7,315,513 B2 | 1/2008 | McCann et al. | |
| 7,321,926 B1 | 1/2008 | Zhang et al. | |
| 7,324,447 B1 | 1/2008 | Morford | |
| 7,350,229 B1 | 3/2008 | Lander | |
| 7,359,974 B1 | 4/2008 | Quinn et al. | |
| 7,362,762 B2 | 4/2008 | Williams, Jr. et al. | |
| 7,366,755 B1 | 4/2008 | Cuomo et al. | |
| 7,409,450 B2 | 8/2008 | Jorgensen | |
| 7,421,515 B2 | 9/2008 | Marovich | |
| 7,463,637 B2 | 12/2008 | Bou-Diab et al. | |
| 7,484,011 B1 | 1/2009 | Agasaveeran et al. | |
| 7,496,750 B2 | 2/2009 | Kumar et al. | |
| 7,571,313 B2 | 8/2009 | Messerges et al. | |
| 7,586,851 B2 | 9/2009 | Panigrahy et al. | |
| 7,596,137 B2 | 9/2009 | Bennett | |

(56) References Cited

U.S. PATENT DOCUMENTS

| | | |
|---|---|---|
| 7,599,283 B1 | 10/2009 | Varier et al. |
| 7,619,983 B2 | 11/2009 | Panigrahy |
| 7,623,468 B2 | 11/2009 | Panigrahy et al. |
| 7,624,436 B2 | 11/2009 | Balakrishnan et al. |
| 7,711,857 B2 | 5/2010 | Balassanian |
| 7,721,084 B2 | 5/2010 | Salminen et al. |
| 8,009,566 B2 | 8/2011 | Zuk et al. |
| 8,270,413 B2 | 9/2012 | Weill et al. |
| 8,584,131 B2 | 11/2013 | Wong et al. |
| 2001/0032254 A1 | 10/2001 | Hawkins |
| 2001/0049741 A1 | 12/2001 | Skene et al. |
| 2001/0049786 A1 | 12/2001 | Kawan et al. |
| 2002/0025036 A1 | 2/2002 | Sato |
| 2002/0054567 A1 | 5/2002 | Fan |
| 2002/0055980 A1 | 5/2002 | Goddard |
| 2002/0057678 A1 | 5/2002 | Jiang et al. |
| 2002/0059428 A1 | 5/2002 | Susai et al. |
| 2002/0073223 A1 | 6/2002 | Darnell et al. |
| 2002/0085587 A1 | 7/2002 | Mascolo |
| 2002/0103663 A1 | 8/2002 | Bankier et al. |
| 2002/0107903 A1 | 8/2002 | Richter et al. |
| 2002/0126671 A1 | 9/2002 | Ellis et al. |
| 2002/0133586 A1 | 9/2002 | Shanklin et al. |
| 2002/0141393 A1 | 10/2002 | Eriksson et al. |
| 2002/0147916 A1 | 10/2002 | Strongin et al. |
| 2002/0169980 A1 | 11/2002 | Brownell |
| 2003/0018827 A1 | 1/2003 | Guthrie et al. |
| 2003/0043755 A1 | 3/2003 | Mitchell |
| 2003/0050974 A1 | 3/2003 | Mani-Meitav et al. |
| 2003/0061256 A1 | 3/2003 | Mathews et al. |
| 2003/0069973 A1 | 4/2003 | Ganesan et al. |
| 2003/0097460 A1 | 5/2003 | Higashiyama et al. |
| 2003/0097484 A1 | 5/2003 | Bahl |
| 2003/0097593 A1 | 5/2003 | Sawa et al. |
| 2003/0103466 A1 | 6/2003 | McCann et al. |
| 2003/0110230 A1 | 6/2003 | Holdsworth et al. |
| 2003/0112755 A1 | 6/2003 | McDysan |
| 2003/0123447 A1 | 7/2003 | Smith |
| 2003/0126029 A1 | 7/2003 | Dastidar et al. |
| 2003/0139183 A1 | 7/2003 | Rantalainen |
| 2003/0140230 A1 | 7/2003 | de Jong et al. |
| 2003/0154406 A1 | 8/2003 | Honarvar et al. |
| 2003/0169859 A1 | 9/2003 | Strathmeyer et al. |
| 2003/0172090 A1 | 9/2003 | Asunmaa et al. |
| 2003/0177267 A1 | 9/2003 | Orava et al. |
| 2003/0179738 A1 | 9/2003 | Diachina et al. |
| 2003/0214948 A1 | 11/2003 | Jin et al. |
| 2003/0217171 A1 | 11/2003 | Von Stuermer et al. |
| 2003/0223413 A1 | 12/2003 | Guerrero |
| 2003/0235204 A1* | 12/2003 | Azevedo et al. ............ 370/466 |
| 2004/0004975 A1 | 1/2004 | Shin et al. |
| 2004/0006638 A1 | 1/2004 | Oberlander et al. |
| 2004/0008629 A1 | 1/2004 | Rajagopal et al. |
| 2004/0008664 A1 | 1/2004 | Takahashi et al. |
| 2004/0008728 A1 | 1/2004 | Lee |
| 2004/0010473 A1 | 1/2004 | Hsu et al. |
| 2004/0015686 A1 | 1/2004 | Connor et al. |
| 2004/0017796 A1 | 1/2004 | Lemieux et al. |
| 2004/0034773 A1 | 2/2004 | Balabine et al. |
| 2004/0037322 A1 | 2/2004 | Sukonik et al. |
| 2004/0052257 A1 | 3/2004 | Abdo et al. |
| 2004/0078491 A1* | 4/2004 | Gormish et al. ............ 709/247 |
| 2004/0083394 A1 | 4/2004 | Brebner et al. |
| 2004/0088585 A1 | 5/2004 | Kaler et al. |
| 2004/0095934 A1 | 5/2004 | Cheng et al. |
| 2004/0098619 A1 | 5/2004 | Shay |
| 2004/0098620 A1 | 5/2004 | Shay |
| 2004/0107360 A1 | 6/2004 | Herrmann et al. |
| 2004/0148425 A1 | 7/2004 | Haumont et al. |
| 2004/0177276 A1 | 9/2004 | MacKinnon et al. |
| 2004/0193513 A1 | 9/2004 | Pruss et al. |
| 2004/0218603 A1 | 11/2004 | Lee et al. |
| 2004/0225810 A1 | 11/2004 | Hiratsuka |
| 2004/0225880 A1 | 11/2004 | Mizrah |
| 2004/0228360 A1 | 11/2004 | Bae et al. |
| 2004/0230695 A1 | 11/2004 | Anschutz et al. |
| 2004/0240446 A1 | 12/2004 | Compton |
| 2004/0255243 A1 | 12/2004 | Vincent, III |
| 2004/0260657 A1 | 12/2004 | Cockerham |
| 2004/0260745 A1* | 12/2004 | Gage et al. ............ 709/200 |
| 2005/0021957 A1 | 1/2005 | Gu |
| 2005/0049934 A1 | 3/2005 | Nakayama et al. |
| 2005/0060295 A1 | 3/2005 | Gould et al. |
| 2005/0063303 A1 | 3/2005 | Samuels et al. |
| 2005/0063307 A1 | 3/2005 | Samuels et al. |
| 2005/0071643 A1 | 3/2005 | Moghe |
| 2005/0074007 A1 | 4/2005 | Samuels et al. |
| 2005/0091513 A1 | 4/2005 | Mitomo et al. |
| 2005/0108420 A1 | 5/2005 | Brown et al. |
| 2005/0114700 A1 | 5/2005 | Barrie et al. |
| 2005/0125692 A1 | 6/2005 | Cox et al. |
| 2005/0132060 A1 | 6/2005 | Mo et al. |
| 2005/0135436 A1 | 6/2005 | Nigam et al. |
| 2005/0144278 A1 | 6/2005 | Atamaniouk |
| 2005/0154914 A1 | 7/2005 | Eguchi et al. |
| 2005/0160289 A1 | 7/2005 | Shay |
| 2005/0171930 A1 | 8/2005 | Arning et al. |
| 2005/0187979 A1 | 8/2005 | Christensen et al. |
| 2005/0193208 A1 | 9/2005 | Charrette, III et al. |
| 2005/0203988 A1 | 9/2005 | Nollet et al. |
| 2005/0216555 A1 | 9/2005 | English et al. |
| 2005/0238010 A1 | 10/2005 | Panigrahy et al. |
| 2005/0238011 A1 | 10/2005 | Panigrahy |
| 2005/0238012 A1 | 10/2005 | Panigrahy et al. |
| 2005/0238022 A1 | 10/2005 | Panigrahy |
| 2005/0265235 A1 | 12/2005 | Accapadi et al. |
| 2005/0271048 A1 | 12/2005 | Casey |
| 2005/0278775 A1 | 12/2005 | Ross |
| 2006/0005008 A1 | 1/2006 | Kao |
| 2006/0020598 A1 | 1/2006 | Shoolman et al. |
| 2006/0026290 A1 | 2/2006 | Pulito et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0036747 A1 | 2/2006 | Galvin et al. |
| 2006/0037071 A1 | 2/2006 | Rao et al. |
| 2006/0041507 A1 | 2/2006 | Novack et al. |
| 2006/0056443 A1 | 3/2006 | Tao et al. |
| 2006/0062228 A1 | 3/2006 | Ota et al. |
| 2006/0089994 A1 | 4/2006 | Hayes |
| 2006/0123226 A1 | 6/2006 | Kumar et al. |
| 2006/0153228 A1 | 7/2006 | Stahl et al. |
| 2006/0161667 A1 | 7/2006 | Umesawa et al. |
| 2006/0174332 A1 | 8/2006 | Bauban et al. |
| 2006/0227802 A1 | 10/2006 | Du et al. |
| 2006/0233166 A1 | 10/2006 | Bou-Diab et al. |
| 2006/0235973 A1 | 10/2006 | McBride et al. |
| 2006/0239503 A1 | 10/2006 | Petrovic et al. |
| 2006/0242300 A1 | 10/2006 | Yumoto et al. |
| 2006/0242688 A1 | 10/2006 | Paramasivam et al. |
| 2006/0265689 A1 | 11/2006 | Kuznetsov et al. |
| 2006/0276196 A1 | 12/2006 | Jiang et al. |
| 2006/0288404 A1 | 12/2006 | Kirshnan et al. |
| 2006/0291402 A1 | 12/2006 | Yun et al. |
| 2006/0294366 A1 | 12/2006 | Nadalin et al. |
| 2007/0094336 A1 | 4/2007 | Pearson |
| 2007/0094714 A1 | 4/2007 | Bauban et al. |
| 2007/0121615 A1 | 5/2007 | Weill et al. |
| 2007/0153798 A1 | 7/2007 | Krstulich |
| 2007/0156919 A1 | 7/2007 | Potti et al. |
| 2008/0034127 A1 | 2/2008 | Nishio |
| 2008/0253366 A1 | 10/2008 | Zuk et al. |
| 2008/0270618 A1 | 10/2008 | Rosenberg |
| 2008/0291910 A1 | 11/2008 | Tadimeti et al. |
| 2008/0320582 A1 | 12/2008 | Chen et al. |
| 2009/0063852 A1 | 3/2009 | Messerges et al. |
| 2009/0077618 A1 | 3/2009 | Pearce et al. |
| 2009/0106433 A1 | 4/2009 | Knouse et al. |
| 2009/0252148 A1 | 10/2009 | Dolganow et al. |
| 2009/0295905 A1 | 12/2009 | Civanlar et al. |

(56) References Cited

U.S. PATENT DOCUMENTS

2009/0327113 A1   12/2009   Lee et al.
2010/0251343 A1   9/2010   Barrett

OTHER PUBLICATIONS

"Consistent Hashing," Wikipedia—the free encyclopedia, http://en.wikipedia.org/w/index.php?title=Consistent_hashing&print . . . , accessed Jul. 25, 2008, 1 page.
"Control Plane," Wikipedia—the free encyclopedia, http://en.wikipedia.org/w/index.php?title=Control_plane&printable=yes, accessed Jul. 31, 2008, 4 pages.
"Data Compression Applications and Innovations Workshop," Proceedings of a Workshop held in conjuction with the IEEE Data Compression Conference, Mar. 31, 1995, 123 pages.
"Direct Access Storage Device Compression and Decompression Data Flow," IBM Technical Disclosure Bulletin, vol. 38, No. 11, Nov. 1995, pp. 291-295.
"Drive Image Professional for DOS, OS/2 and Windows," WSDC Download Guide, http://wsdcds01.watson.ibm.com/WSDC.nsf/Guides/Download/Applications-DriveImage.htm, accessed Nov. 22, 1999, 4 pages.
"Drive Image Professional," WSDC Download Guide, http://wsdcds01.watson.ibm.com/wsdc.nsf/Guides/Download/Applications-DriveImage.htm, accessed May 3, 2001, 5 pages.
"editcap—Edit and/or translate the format of capture files," ethereal.com, www.ethereal.com/docs/man-pages/editcap.1.html, accessed Apr. 15, 2004, 3 pages.
"ethereal—Interactively browse network traffic," ethereal.com, www.ethereal.com/docs/man-pages/ethereal.1.html, accessed Apr. 15, 2004, 29 pages.
"FAQ: Network Intrusion Detection Systems," robertgraham.com, Mar. 21, 2000, www.robertgraham.com/pubs/network-intrusion-detection.html, accessed Apr. 15, 2004.
"Forwarding Plane." Wikipedia—the free encyclopedia. http://en.wikipedia.org/w/index.php?title=Forwarding_plane&printa . . . , accessed Jul. 31, 2008.
"IBM Announces New Feature for 3480 Subsystem," Tucson Today, vol. 12, No. 337, Jul. 25, 1989, 1 page.
"IBM Technology Products Introduces New Family of High-Performance Data Compression Products," IBM Corporation, Somers, NY, Aug. 16, 1993, 6 pages.
"Magstar and IBM 3590 High Performance Tape Subsystem Technical Guide," IBM, Nov. 1996, 287 pages.
"Network Management," Wikipedia—the free encyclopedia, http://en.wikipedia.org/w/index.php?title=Network_management< . . . , accessed Jul. 31, 2008, 3 pages.
"Network Sniffer," linuxmigration.com, www.linuxmigration.com/quickref/admin/ethereal.html, accessed Apr. 15, 2004, 4 pages.
"Telecommunications Network," Wikipedia—the free encyclopedia, http://en.wikipedia.org/w/index.php?title=Telecommunications_net . . . , accessed Jul. 31, 2008, 2 pages.
"tetherea—Dump and analyze network traffic," ethereal.com, www.ethereal.com/docs/man-pages/tethereal.1.html, accessed Apr. 15, 2004, 11 pages.
About Computing & Technology, "Wireless/Networking, Nagle algorithm," visited Dec. 6, 2005, 2 pages, http://compnetworking.about.com/od/tcpip/l/bldef_nagle.htm.
Acharya et al., "Scalable Web Request Routing with MPLS," IBM Research Report, IBM Research Division, Dec. 5, 2001.
Adaptive Lossless Data Compression—ALDC, IBM, Jun. 15, 1994, 2 pages.
ALDC-Macro—Adaptive Lossless Data Compression, IBM Microelectronics, May 1994, 2 pages.
ALDC1-20S—Adaptive Lossless Data Compression, IBM Microelectronics, May 1994, 2 pages.
ALDC1-40S—Adaptive Lossless Data Compression, IBM Microelectronics, May 1994, 2 pages.
ALDC1-5S—Adaptive Lossless Data Compression, IBM Microelectronics, May 1994, 2 pages.
Australia's Academic and Research Network, "Programs and large MTU, Nagle algorithm," visited Dec. 9, 2005, 3 pages, http://www.aarnet.edu.au/engineering/networkdesign/mtu/programming.html.
Berners-Lee, T. et al., "Uniform Resource Identifiers (URI): Generic Syntax," 2396, Aug. 1998.
Berners-Lee, T. et al., RFC 1945, "Hypertext Transfer Protocol—HTTP/1.0," May 1996, 60 pages.
Braden, R., "Requirements for Internet Hosts," RFC 1122, Oct. 1989, 101 pages.
Bryhni et al., "A Comparison of Load Balancing Techniques for Scalable Web Servers," IEEE Network, Jul./Aug. 2000, pp. 58-64.
Castineyra, I. et al., "The Nimrod Routing Architecture," RFC 1992, Aug. 1996, 27 pages.
Cheng, J.M. et al., "A Fast, Highly Reliable Data Compression Chip and Algorithm for Storage Systems," IBM, vol. 40, No. 6, Nov. 1996, 11 pages.
Costlow, T., "Sony Designs Faster, Denser Tape Drive," Electronic Engineering Times, May 20, 1996, 2 pages.
Craft, D. J., "A Fast Hardware Data Compression Algorithm and Some Algorithmic Extensions," IBM Journal of Research and Development, vol. 42, No. 6, Nov. 1998, 14 pages.
Craft, D. J., "Data Compression Choice No Easy Call," Computer Technology Review, Jan. 1994, 2 pages.
Degermark, M. et al., "Low-Loss TCP/IP Header Compression for Wireless Networks," J.C. Baltzar AG, Science Publishers, Oct. 1997, pp. 375-387.
Dierks, T. et al., RFC 2246, "The TLS Protocol, Version 1.0," Jan. 1999, 80 pages.
Electronic Engineering Times, Issue 759, Aug. 16, 1993, 37 pages.
Electronic Engineering Times, Issue 767, Oct. 11, 1993, 34 pages.
Enger, R., et al., "FYI on a Network Management Tool Catalog: Tools for Monitoring and Debugging TCP/IP Internets and Interconnected Devices," RFC 1470, Jun. 1993, 52 pages.
F5 Networks Delivers Blistering Application Traffic Management Performance and Unmatched Intelligence via New Packet Velocity ASIC and BIG-IP Platforms, F5 Networks, Inc. Press Release dated Oct. 21, 2002, 3 pages.
Fielding, R. et al., RFC 2616, "Hypertext Transfer Protocol—HTTP/1.1," Jun. 1999, 114 pages.
Fielding. R. et al., "Hypertext Transfer Protocol—HTTP/1.1," Network Working Group, RFC 2068, Jan. 1997, 152 pages.
fifi.org, "Manpage of TCP," visited Dec. 9, 2005, 6 pages, http://www.fifi.org/cgi-bin/man2html/usr/share/man/man7/tcp.7.gz.
Freier, A. et al., "The SSL Protocol Version 3.0," IETF, Internet Draft, Nov. 18, 1996, 60 pages.
Freier, A. et al., Netscape Communications Corporation, "The SSL Protocol, Version 3.0," Mar. 1996, 60 pages.
Hewitt. J. R. et al., "Securities Practice and Electronic Technology," Corporate Securities Series, (New York: Law Journal Seminars-Press) 1998, title page, bibliography page, pp. 4.29-4.30.
Hinden, R. et al., "Format for Literal IPv6 Addresses in URL's," IETF RFC 2732, Dec. 1999.
Hochmuth, P., "F5, CacheFlow Pump Up Content-Delivery Lines," NetworkWorld, May 4, 2001, http://www.network.com/news/2001/0507cachingonline.html, accessed Jun. 1, 2005, 3 pages.
Housley, R., et al., "Internet X.509 Public Key Infrastructure Certificate and CRL Profile," RFC 2459, Jan. 1999, 115 pages.
IBM Microelectronics Comdex Fall 1993 Booth Location, 1 page.
IP Multimedia Subsystem, http://en.wikipedia.org/w/index.php?title=IP_Multimedia_Subsyst . . . , accessed May 15, 2008, 8 pages.
Jacobson, V. et al., "TCP Extensions for High Performance," May 1992, http://www.faqs.org/rfcs/rfc1323.html, pp. 1-37.
Kessler, G. et al., RFC 1739, "A Primer on Internet and TCP/IP Tools," Dec. 1994, 46 pages.
Mapp, G., "Transport Protocols—What's wrong with TCP," Jan. 28, 2004, LCE Lecture at: http://www-Ice.eng.cam.ac.uk/~gem11, 4F5-Lecture4.pdf, pp. 1-60.
Nagle, J., RFC 896, "Congestion control in IP/TCP internetworks," Jan. 6, 1984, 13 pages.

(56) References Cited

OTHER PUBLICATIONS

Nielsen. H. F. et al., "Network Performance Effects of HTTP/1.1, CSS1, and PNG," Jun. 24, 1997, W3 Consortium http://www.w3.org/TR/NOTE-pipelining-970624$Id:Pipeline.html, v 1.48 199/10/18 19:38:45 root Exp $, pp. 1-19 Consortium.
OpenSSL, visited Apr. 12, 2006, 1 page, www.openssl.org.
Oracle Communication and Mobility Server, Aug. 2007, http://www.oracle.com/technology/products/ocms/otn_front.html, accessed May 15, 2008, 108 pages.
Paxson, V., RFC 2525, "Known TCP Implementation Problems," Mar. 1999, 61 pages.
Postel, J., "Transmission Control Protocol," Sep. 1981, Information Sciences Institute, University of Southern California, Marina del Rey, California, http://www.faqs.org/rfcs/rfc793.html, pp. 1-21.
Readme, Powerquest Corporation, 1994-2002, 6 pages.
Reardon, M., "A Smarter Session Switch: Arrowpoint's CS Session Switches Boast the Brains Needed for E-Commerce," Data Communications, Jan. 1999, title page, pp. 3, 5, 18.
Rescorla, E. "SSL and TLS, Designing and Building Secure Systems", 2001, Addison-Wesley, 46 pages.
RSA Laboratories, "PKCS #1 v2.0: RSA Cryoptography Standard," Oct. 1, 1998, 35 pages.
Schneider, K. et al. "PPP for Data Compression in Data Circuit-Terminating Equipment (DCE)," RFC 1976, Aug. 1996m 10 pages.
Schroeder et al., "Scalable Web ServerCiustering Technologies," IEEE Network May/Jun. 2000, pp. 38-45.
SearchNetworking.com, "Nagle's algorithm," visited Dec. 6, 2005, 3 pages, http://searchnetworking.techtarget.com/sDefinition/0,,sid7_gc1754347,00.html.
Secure and Optimize Oracle 11i E-Business Suite with F5 Solutions, F5 Application Ready Network Guide, Oracle E-Business Suite 11i, Aug. 2007, 2 pages.
Session Initiation Protocol, http://en.wikipedia.org/w/index.php?title=Session_Initiation_Protoc . . . , accessed May 14, 2008, 5 pages.
Simpson, W. "The Point-To-Point Protocol (PPP)," RFC 1661, Jul. 1994, 54 pages.
Stevens, W. R., "TCP/IP Illustrated," vol. 1: The Protocols, Addison-Wesley Professional, Dec. 31, 1993, pp. 1-17.
Stevens, W., "TCP Slow Start, Congestion Avoidance, Fast Retransmit, and Fast Recovery Algorithms," Jan. 1997, Sunsite.dk, http://rfc.sunsite.dk/rfc/rfc2001.html, pp. 1-6.
Tormasov, A. et al., "TCP/IP options for high-performance data transmission," visited Dec. 9, 2005, 4 pages, http://builder.com/5100-6732-1050878.html.
Using the Universal Inspection Engine, Manual Chapter: BIG-IP Solutions Guide v4.6.2: Using the Universal Inspection Engine, 2002, 8 pages.
Valloppillil, V. et al., "Cache Array Routing Protocol v1.0," Feb. 1998, http://icp.ircache.net/carp.txt, accessed Jul. 25, 2008, 7 pages.
W3C, "HTTP/1.1 and Nagle's Algorithm," visited Dec. 6, 2005, 3 pages, http://www.w3.org/Protocols/HTTP/Performance/Nagle/.
Zebrose, K. L., "Integrating Hardware Accelerators into Internetworking Switches," Telco Systems, Nov. 1993, 10 pages.
Official Communication for U.S. Appl. No. 10/172,411 mailed Dec. 16, 2005.
Official Communication for U.S. Appl. No. 10/172,411 mailed Jun. 19, 2006.
Official Communication for U.S. Appl. No. 10/172,411 mailed Sep. 1, 2006.
Official Communication for U.S. Appl. No. 10/172,411 mailed Nov. 13, 2006.
Official Communication for U.S. Appl. No. 10/172,411 mailed Apr. 30, 2007.
Official Communication for U.S. Appl. No. 10/172,411 mailed Oct. 18, 2007.
Official Communication for U.S. Appl. No. 10/172,411 mailed Apr. 25, 2008.
Official Communication for U.S. Appl. No. 10/172,411 mailed Oct. 1, 2008.
Official Communication for U.S. Appl. No. 10/409,951 mailed Jun. 16, 2006.
Official Communication for U.S. Appl. No. 10/409,951 mailed Nov. 30, 2006.
Official Communication for U.S. Appl. No. 10/409,951 mailed Mar. 8, 2007.
Official Communication for U.S. Appl. No. 10/409,951 mailed Aug. 24, 2007.
Official Communication for U.S. Appl. No. 10/409,951 mailed Jan. 4, 2008.
Official Communication for U.S. Appl. No. 10/409,951 mailed Jul. 17, 2008.
Official Communication for U.S. Appl. No. 10/719,375 mailed Jun. 18, 2008.
Official Communication for U.S. Appl. No. 10/719,375 mailed Apr. 24, 2009.
Official Communication for U.S. Appl. No. 10/719,375 mailed Nov. 13, 2009.
Official Communication for U.S. Appl. No. 10/719,375 mailed May 25, 2010.
Official Communication for U.S. Appl. No. 10/719,375 mailed Dec. 7, 2010.
Official Communication for U.S. Appl. No. 10/719,375 mailed Jun. 16, 2011.
Official Communication for U.S. Appl. No. 10/719,375 mailed Jan. 25, 2012.
Official Communication for U.S. Appl. No. 11/139,061 mailed Feb. 5, 2009.
Official Communication for U.S. Appl. No. 11/139,061 mailed Sep. 22, 2009.
Official Communication for U.S. Appl. No. 11/258,551 mailed Mar. 3, 2009.
Official Communication for U.S. Appl. No. 11/258,551 mailed Jan. 4, 2010.
Official Communication for U.S. Appl. No. 11/258,551 mailed Aug. 3, 2010.
Official Communication for U.S. Appl. No. 11/258,551 mailed Mar. 31, 2011.
Official Communication for U.S. Appl. No. 11/258,551 mailed Aug. 15, 2012.
Official Communication for U.S. Appl. No. 11/366,367 mailed Aug. 22, 2008.
Official Communication for U.S. Appl. No. 11/366,367 mailed Feb. 11, 2009.
Official Communication for U.S. Appl. No. 11/366,367 mailed Aug. 4, 2009.
Official Communication for U.S. Appl. No. 11/366,367 mailed Mar. 3, 2010.
Official Communication for U.S. Appl. No. 11/366,367 mailed Jun. 9, 2010.
Official Communication for U.S. Appl. No. 11/366,367 mailed Nov. 9, 2010.
Official Communication for U.S. Appl. No. 11/366,367 mailed Mar. 11, 2011.
Official Communication for U.S. Appl. No. 11/366,367 mailed Jun. 1, 2011.
Official Communication for U.S. Appl. No. 12/199,768 mailed Jun. 18, 2010.
Official Communication for U.S. Appl. No. 12/199,768 mailed Nov. 22, 2010.
Official Communication for U.S. Appl. No. 12/199,768 mailed Feb. 1, 2011.
Official Communication for U.S. Appl. No. 12/475,307 mailed Feb. 10, 2011.
Official Communication for U.S. Appl. No. 12/475,307 mailed Jul. 22, 2011.
Official Communication for U.S. Appl. No. 12/475,307 mailed Sep. 29, 2011.
Official Communication for U.S. Appl. No. 11/243,844 mailed Oct. 8, 2008.
Official Communication for U.S. Appl. No. 11/243,844 mailed Feb. 20, 2009.

(56) References Cited

OTHER PUBLICATIONS

Official Communication for U.S. Appl. No. 11/243,844 mailed Jul. 16, 2009.
Official Communication for U.S. Appl. No. 11/243,844 mailed Feb. 19, 2010.
Official Communication for U.S. Appl. No. 11/243,844 mailed Aug. 3, 2010.
Official Communication for U.S. Appl. No. 11/243,844 mailed Dec. 27, 2010.
Official Communication for U.S. Appl. No. 11/243,844 mailed Jun. 9, 2011.
Official Communication for U.S. Appl. No. 11/243,844 mailed Nov. 8, 2011.
Official Communication for U.S. Appl. No. 11/243,844 mailed Jun. 14, 2012.
Official Communication for U.S. Appl. No. 11/366,367 mailed May 18, 2012.
Official Communication in U.S. Appl. No. 10/719,375, mailed Feb. 27, 2013.
Official Communication for U.S. Appl. No. 11/243,844 mailed Nov. 26, 2012.
Official Communication for U.S. Appl. No. 11/258,551 mailed Dec. 6, 2012.
Official Communication for U.S. Appl. No. 12/199,768 mailed Dec. 16, 2013.
Official Communication for U.S. Appl. No. 10/719,375 mailed Dec. 23, 2013.
Office Communication for U.S. Appl. No. 10/719,375 mailed on Mar. 27, 2014.
Office Communication for U.S. Appl. No. 10/719,375 mailed on Dec. 23, 2013.
Office Communication for U.S. Appl. No. 12/199,768 mailed on Dec. 16, 2013.
Office Communication for U.S. Appl. No. 13/615,007 mailed on Jan. 7, 2014.
Office Communication for U.S. Appl. No. 13/174,237 mailed on Mar. 21, 2014.
Office Communication for U.S. Appl. No. 13/174,237 mailed on Sep. 25, 2014.
Office Communication for U.S. Appl. No. 12/199,768 mailed on Apr. 23, 2014.
Office Communication for U.S. Appl. No. 12/199,768 mailed on Sep. 24, 2014.
Fielding, R. et al., "Hypertext Transfer Protocol-HTTP/1.1", Jun. 1999 pp. 1-114, W3 Consortium, http://www.w3.org/Protocols/HTTP/1.1/rfc2616.pdf.
Official Communication for U.S. Appl. No. 13/174,237 mailed Mar. 21, 2014.
Official Communication for U.S. Appl. No. 13/174,237 mailed Dec. 8, 2014.
Official Communication for U.S. Appl. No. 12/199.768 mailed Jan. 15, 2015.
Official Communication for U.S. Appl. No. 12/475,307 mailed Jan. 26, 2015.
Official Communication for U.S. Appl. No. 13/174,237 mailed Apr. 6, 2015.
Official Communication for U.S. Appl. No. 12/199,768 mailed Apr. 29, 2015.
Official Communication for U.S. Appl. No. 10/719,375 mailed Feb. 27, 2013.
Office Communication for U.S. Appl. No. 10/719,375 mailed on Jan. 29, 2015.
Official Communication for U.S. Appl. No. 11/366,367 mailed Jun. 21, 2013.
Official Communication for U.S. Appl. No. 13/229,483 mailed May 13, 2013.
Official Communication for U.S. Appl. No. 13/592,187 mailed Aug. 16, 2013.
Schneider, K. et al. "PPP for Data Compression in Data Circuit-Terminating equipment (DCE)," RFC: 1976, Aug. 1996, 10 pages.

\* cited by examiner

PROTOCOL-CONFIGURABLE TRANSACTION PROCESSING

CROSS REFERENCE TO RELATED APPLICATIONS

This application is a Continuation of U.S. patent application Ser. No. 11/243,844, filed Oct. 5, 2005, the benefit of which are claimed under 35 U.S.C. §120, and further of a U.S. Provisional Patent Application, Ser. No. 60/707,856 filed on Aug. 12, 2005, the benefit of the earlier filing date of which is hereby claimed under 35 U.S.C. §119(e) and further incorporated by reference.

FIELD OF THE INVENTION

The present invention relates generally to network communications, and more particularly, but not exclusively, to employing a traffic management device to process network transactions.

BACKGROUND OF THE INVENTION

Network traffic management mechanisms are typically deployed to mediate data communications between remote client devices and one or more server devices. Depending on the features of the protocol governing the communication, various optimizations may be achieved by a traffic management device or another intermediate network device. For example, some protocols support persistent client connections, in which a client can make multiple requests, and receive multiple responses, on the same network connection. Employing multiple requests on the same connection may be economical because it reduces the setup and teardown time associated with the underlying transport protocol. The traffic management device may then allocate the multiple requests to different backend servers for various purposes, such as load balancing. This process is known as connection splitting or connection multiplexing. In some protocols, the responses from the multiple backend servers to the external client connection must be sent back in order by the traffic management device.

A traffic management device may also be employed for connection aggregation, in which requests from multiple clients are allocated to the same backend server connection. Connection aggregation achieves economies on the backend connection and generally enables a set of servers to scalably handle a larger number of client requests.

Many protocols may be susceptible to some form of connection splitting and/or connection aggregation by an intermediate network device managing transactions that conform to the requirements of those protocols. This may enable clients and/or backend servers to be used more efficiently or scalably. However, traffic management devices have generally not been designed to be adaptable by users or administrators of the devices to support such services for arbitrary protocols, including foreign protocols that the device is not pre-configured to natively support, and including proprietary protocols or protocols for which limited information is available to the user.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description of the invention, which is to be read in association with the accompanying drawings, wherein.

DETAILED DESCRIPTION OF THE INVENTION

Figure 1:
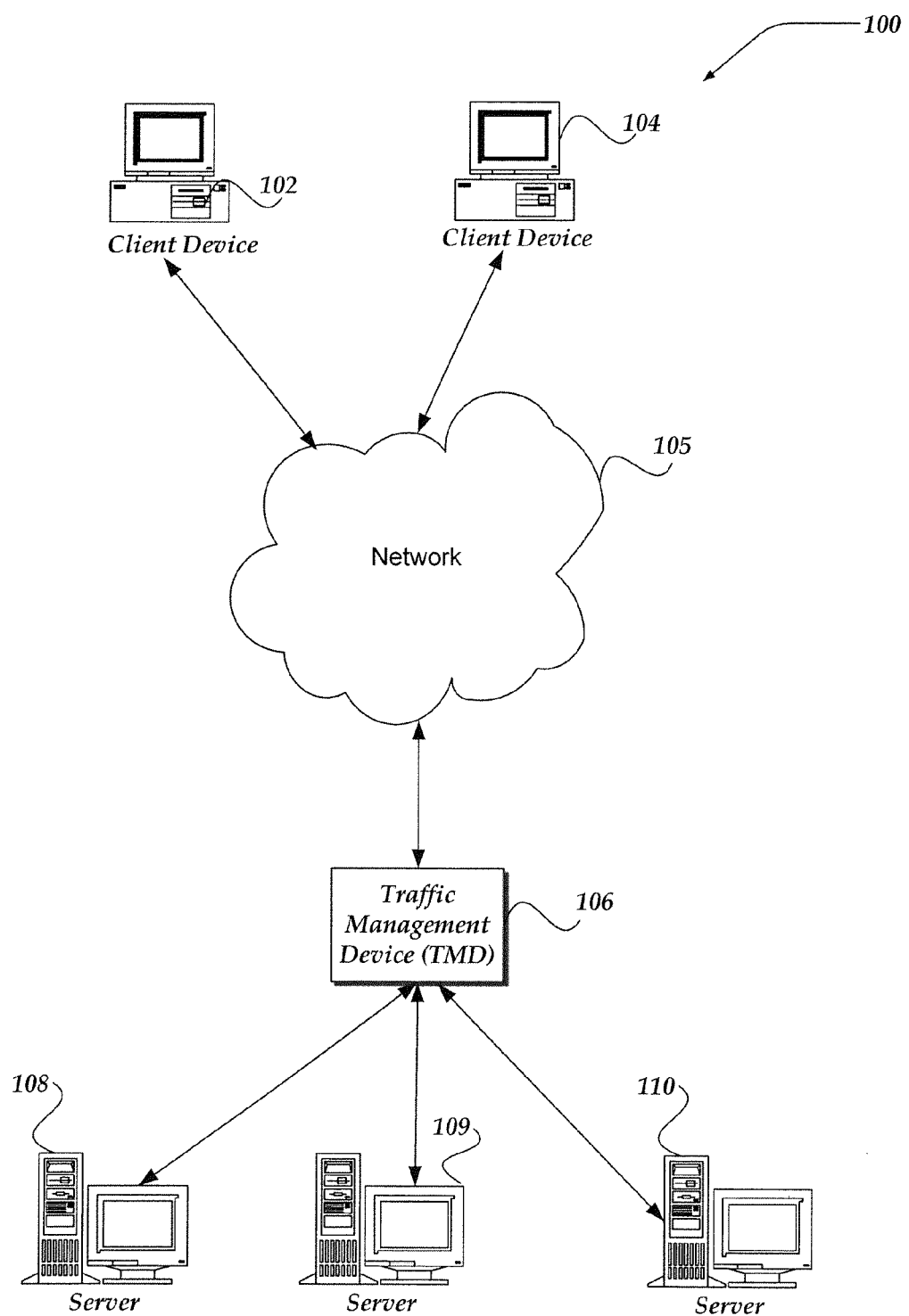
FIG. 1 shows a functional block diagram illustrating one embodiment of an environment for practicing the invention.

The present invention will now be described more fully hereinafter with reference to the accompanying drawings, which form a part hereof, and which show, by way of illustration, specific exemplary embodiments by which the invention may be practiced. The invention may, however, be embodied in many different forms, and this specification should not be construed to limit the invention to the embodiments set forth herein. Rather, these embodiments are provided so that this disclosure will be thorough and complete and will convey fully the scope of the invention to those skilled in the art. The present invention may be embodied as methods or as devices, among other embodiments. Accordingly, the invention may take the form of a hardware embodiment, a software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is used in an inclusive sense, and is equivalent to the term "and/or", unless the context clearly dictates otherwise. The term "based on" is not exclusive and allows for being based on additional factors not described, unless the context clearly dictates otherwise. In addition, throughout the specification, the meanings of "a," "an," and "the" include plural references. The meaning of "in" includes "in" and "on."

The term "network connection" or simply "connection" is directed towards various links, link types, communication interfaces, protocols, or the like, that enable a computing device to communicate with a computing device over a network. One such network connection may be a Transmission Control Protocol (TCP) connection. TCP connections are virtual connections between two network nodes and are typically established through a TCP handshake protocol. The TCP protocol is described in further detail in Request for Comments 793, which is available at http://www.ietforg/rfc/rfc0793.txt?number=793.

Briefly stated, the invention is directed towards enabling a user of an intermediate network device, such as a traffic management device, to configure the device to determine transaction boundaries for network transaction processing, such as connection splitting and/or connection aggregation for an arbitrary transaction-oriented protocol. The configuration may include specifying, in the form of rules defined by way of a scripting language or command language, operations to be performed by the device. The specified rules are evaluated at runtime upon the occurrence of particular triggering network events. In general, the rules, which are adapted to the requirements of a particular protocol, include inspecting incoming data, extracting length and record type specifiers, and buffering an appropriate amount of data to determine transaction boundaries so that transactions may be split and/or aggregated. The configuration provided by the user follows a general approach that reflects elements that are common to many transaction-oriented network protocols (for example, protocol headers containing length specifiers and record type specifiers).

The invention may be employed for such purposes as enabling connection splitting and/or connection aggregation for various protocols, including application-level protocols and including proprietary or quasi-proprietary protocols, protocols for which limited information is available, and foreign protocols. Throughout this specification and the accompanying claims, a protocol is "foreign" with respect to a device if it is not natively supported by the device prior to a configuration of the device by a user. For example, in an embodiment of the invention, rules may be provided for enabling connection splitting for such special-purpose protocols as Internet Inter-ORB Protocol (IIOP), Financial IntereXchange (FIX), and the National Council for Prescription Drug Programs (NCPDP) protocol. The invention thus enables a general-purpose traffic management device to provide connection splitting, connection aggregation, and other services for a particular protocol through configuration of the device by a user, without requiring native support for that protocol to be built into the device beforehand (for example, in the form of a precompiled protocol module). In addition to enabling clients and/or servers to be used more efficiently or in a more scalable manner, embodiments of the invention provide a means for rapidly prototyping connection splitting and/or connection aggregation for a protocol in preparation for a high-performance and maintainable native implementation.

Illustrative Operating Environment

FIG. 1 illustrates one embodiment of an environment in which the invention may operate. However, not all of the depicted components may be required to practice the invention, and variations in the arrangement and type of the components may be made without departing from the spirit or scope of the invention.

As shown, environment 100 includes multiple client devices 102-104, network 105, traffic management device (TMD) 106, and multiple backend servers 108-110. Each of client devices 102-104 is in communication with TMD 106 through network 105. TMD 106 is in further communication with backend servers 108-110. TMD 106 may be in communication with backend servers 108-110 through a network infrastructure, not shown, that is similar to network 105.

Generally, client devices 102-104 may include any computing device capable of connecting to another computing device to send and receive information. As such, client devices 102-104 may range widely in capabilities and features. Client devices 102-104 may include any device that is capable of connecting using a wired or wireless communication medium. The set of such devices may include devices that typically connect by way of a wired communication medium, such as personal computers, workstations, multiprocessor systems, microprocessor-based or programmable consumer electronics, and the like. The set of such devices may also include devices that typically connect using a wireless communication medium, such as cellular or other mobile telephones, personal digital assistants (PDAs), radio frequency (RF) devices, infrared (IR) devices, integrated devices combining one or more of the preceding devices, or another kind of mobile and/or wireless device. Each of client devices 102-104 may be configured to execute a client application or the like to perform various actions, including communicating requests to another device by way of a network interface and in accordance with one or more network protocols.

Network 105 couples each of client devices 102-104 with other network devices, such as TMD 106 or any other network-enabled electronic device. In essence, network 105 includes any communication means by which information may travel between any of client devices 102-104 and TMD 106. In one embodiment, network 105 includes or is a part of the set of interconnected networks that comprise the Internet. Network 105 may include local area networks (LANs), wide area networks (WANs), direct network connections, such as through a Universal Serial Bus (USB) port, or any combination thereof. In an interconnected set of LANs, including those based on differing architectures and protocols, a router may serve as a link between LANs, enabling messages to be sent from one LAN to another.

Communication links within LANs typically include twisted wire pair or coaxial cable, while communication links between networks may employ analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Furthermore, remote devices may be remotely connected to either LANs or WANs by way of a modem and temporary telephone link.

Network 105 may further employ one or more wireless access technologies including, but not limited to, second, third, or fourth generation (2G, 3G, or 4G) radio access for cellular systems, wireless LAN, wireless router (WR) mesh, and the like. Access technologies such as 2G, 3G, or 4G may enable wide area coverage for network devices, such as client devices 102-104, and the like, with various degrees of mobility. For example, network 105 may enable a radio connection through a radio network access such as Global System for Mobile communications (GSM), General Packet Radio Services (GPRS), Enhanced Data GSM Environment (EDGE), Wideband Code Division Multiple Access (WCDMA), and the like. Network 105 may include an infrastructure-oriented wireless network, an ad-hoc wireless network, or another form of wireless network.

TMD 106 may include any of various kinds of devices that manage network traffic. Such devices may include, for example, routers, proxies, firewalls, load balancers, cache devices, devices that perform network address translation, any combination of the preceding devices, and the like. TMD 106 may, for example, control the flow of data packets delivered to and forwarded from an array of servers, such as backend servers 108-110. TMD 106 may direct a request for a resource to a particular server based on network traffic, network topology, capacity of a server, content requested, and various other traffic distribution mechanisms. TMD 106 may receive data packets from and transmit data packets to a device within the Internet, an intranet, or a LAN accessible through another network. TMD 106 may recognize packets that are part of the same communication, transaction, flow, and/or stream and may perform appropriate processing on such packets, such as directing them to the same server so that state information is maintained. TMD 106 may support a wide variety of network applications.

TMD 106 may receive a request from one of client devices 102-104. TMD 106 may select a server from among backend servers 108-110 to which TMD 106 forwards the request. TMD 106 may employ any of a variety of criteria and mechanisms to select the server, including those mentioned above, load balancing mechanisms, and the like. TMD 106 is further configured to receive a response to the request and to forward the response to an appropriate one of client devices 102-104. Moreover, TMD 106 may receive multiple requests in a pipeline from one of client devices 102-104, in which case TMD 106 may forward the requests to one or more selected servers.

TMD 106 may be implemented using one or more general-purpose or special-purpose computing devices of various kinds. Such devices may be implemented solely in hardware or as a combination of hardware and software. For example, such devices may include application-specific integrated circuits (ASICs) coupled to one or more microprocessors. The ASICs may be employed to provide a high-speed switch fabric while the microprocessors may perform higher-layer processing of packets. One embodiment of a network device that may be employed as TMD 106 is network device 200 of FIG. 2, configured with appropriate software.

Backend servers 108-110 may include any computing device capable of data communication with client devices 102-104. Devices that may operate as backend servers 108-110 include personal computers, desktop computers, multiprocessor systems, microprocessor-based or programmable consumer electronics, server machines, and the like. Each of backend servers 108-110 may be configured to perform a different operation or function. Data communication may include communication of data packets, which may be sent to establish a connection, to acknowledge a receipt of data, to transport information such as a request or response, and the like. Packets received by backend servers 108-110 may be formatted in accordance with Transmission Control Protocol/Internet Protocol (TCP/IP), User Datagram Protocol (UDP), or another transport protocol or the like. The packets may be communicated among backend servers 108-110, TMD 106, and client devices 102-104 in accordance with any of various protocols such as protocols within the TCP/IP protocol suite.

In this specification, unless context indicates otherwise, the term "client" refers broadly to a requester of data or services in a particular transaction, and the term "server" refers broadly to a provider of data or services in a particular transaction. In general, a computing device may be configured to function as a client device, as a server device, or as both a client device and a server device. Accordingly, the present invention is applicable to network communication that employs client-server protocols as well as protocols that do not conform to a client-server model.

Illustrative Traffic Management Device

Figure 2:
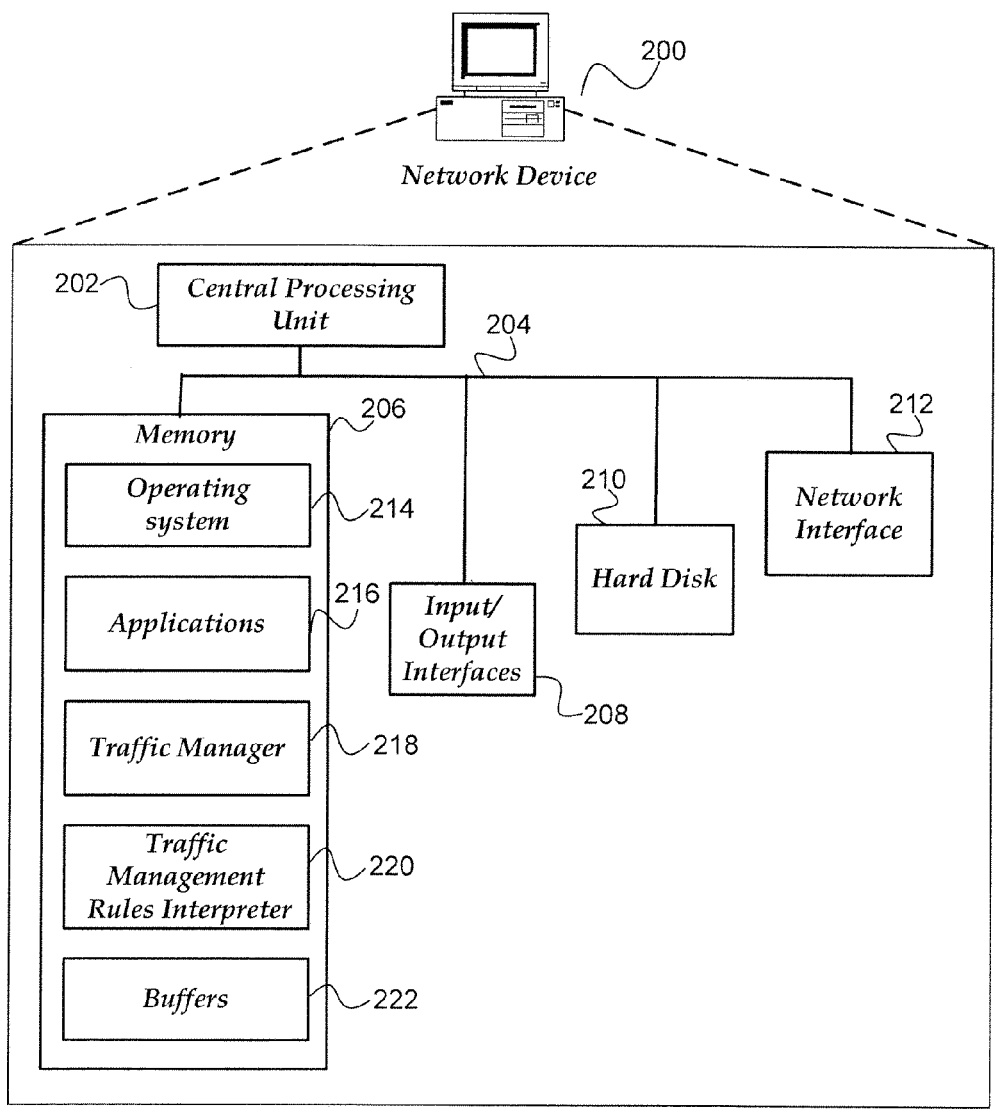
FIG. 2 shows one embodiment of a server device that may be included in a system implementing the invention.

FIG. 2 shows one embodiment of a network device, in accordance with the present invention. Network device 200 may include many more or fewer components than those shown. The components shown, however, are sufficient to disclose an illustrative embodiment for practicing the invention. Network device 200 may represent, for example, TMD 106 of FIG. 1.

Network device 200 includes central processing unit 202, main memory 206, input/output interfaces 208, hard disk 210, and network interface 212, some or all of which communicate by way of bus 204. Hard disk 210 is employed for nonvolatile secondary storage and may also be used along with main memory 206 to implement virtual memory, which may be regarded as part of main memory 206. Main memory 206 typically includes both random-access memory (RAM) and read-only memory (ROM). Input/output interfaces 208 enable communication by central processing unit 202 with input and output devices, such as a display, printer, keyboard, mouse, and storage devices such as an optical disk. Network device 200 communicates over a network, such as network 105 in FIG. 1, by way of network interface 212, which may be configured for use with various network protocols, such as the TCP/IP protocol suite. Network interface 212 may include or be connected to a transceiver, a network interface card (NIC), and the like.

Main memory 206 is one example of a computer storage medium, which in turn is one kind of processor-readable medium. Computer storage media and other processor-readable media may include volatile, nonvolatile, removable, and non-removable media implemented in any technology or by way of any method for storage of information, such as machine-readable instructions, data structures, program modules, or other data. Examples of processor-readable media include RAM, ROM, EEPROM, flash memory or other memory technology, optical storage media, magnetic cassettes, magnetic tape, magnetic disk storage devices or media, or any other medium accessible directly or indirectly by a processor and which may be used to store information volatilely or nonvolatilely. Processor-readable media may further include network communication media that embody or encode data in a modulated data signal such as a carrier wave or other transport mechanism and includes any information delivery media.

Main memory 206 stores processor-executable program code and data. In particular, main memory 206 stores operating system 214, which is executed by central processing unit 202 to control the operation of network device 200. A general-purpose or special-purpose operating system may be employed. Additionally, one or more applications 216 of various kinds may be loaded into main memory 206 by way of operating system 214 and executed by central processing unit 202.

Among the applications 216 that may be loaded and run are traffic manager 218 and traffic management rules interpreter 220. Traffic manager 218 is configured to receive a request from a client device and to forward the request to a server selected based on a variety of criteria. For example, traffic manager 218 may select the server based on any of a variety of load balancing mechanisms, including a round trip time, a least connections, a packet completion rate, a quality of service, a topology, a global availability, a hop metric, a hash of an address in a received packet, a static ratio, a dynamic ratio, a source IP address, a destination IP address, a port number, deep-packet inspections including inspections of application-level data, employing historical data and the like, session persistence, and a round robin mechanism. In another embodiment, traffic manager 218 may forward the request based on a type of request. For example, a database request may be forwarded to a predetermined database server, while an email request may be forwarded to a predetermined mail server. Traffic manager 218 is likewise configured to receive responses from servers and to forward the responses to client devices.

Traffic management rules interpreter 220 enables a user of network device 200 to customize the operation of the device by writing traffic management rules, which may be defined by way of commands, scripts, or the like, to configure traffic manager 218 or other aspects or elements of traffic management actions performed by network device 200. For example, a user who operates network device 200 may write a traffic management rule to inspect the header or payload of a packet received from a client device and to direct the packet to a particular backend server based on the results of the inspection. Traffic management rules interpreter 220 interprets a script defining the rule and causes traffic manager 218 to act on network traffic in accordance with the rule.

Main memory 206 may be employed by operating system 214, applications 216, traffic manager 218, traffic management rules interpreter 220, and other programs to store data, including storage of data in buffers 222.

In one embodiment, network device 200 includes at least one ASIC chip (not shown) coupled to bus 204. The ASIC chip may include logic that performs some of the operations of network device 200. For example, the ASIC chip may perform a number of packet processing functions for incoming and/or outgoing packets, and the ASIC chip may perform at least a portion of the logic to enable the operation of traffic manager 218.

Generalized Operation

Figure 3:
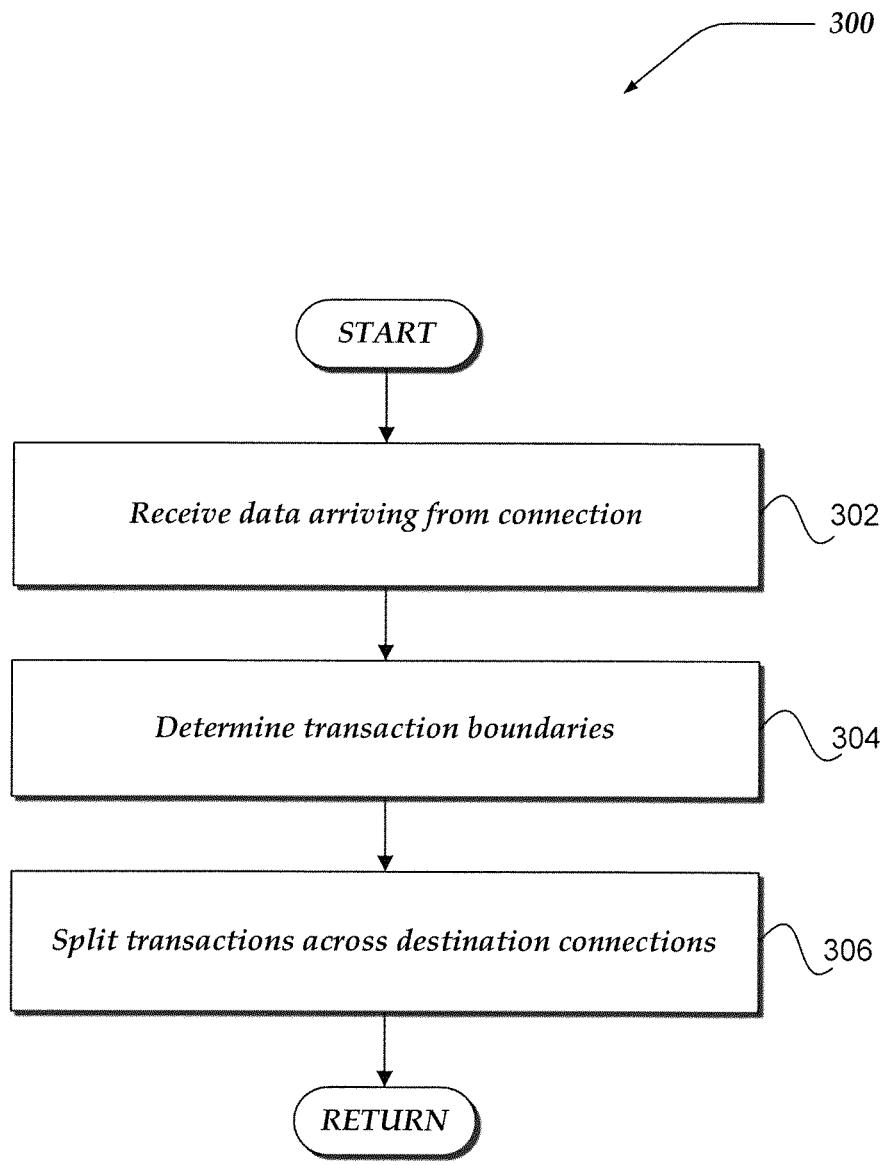
FIG. 3 illustrates a logical flow diagram generally showing a high-level view of one embodiment of a process for connection splitting of network transactions.
Figure 4:
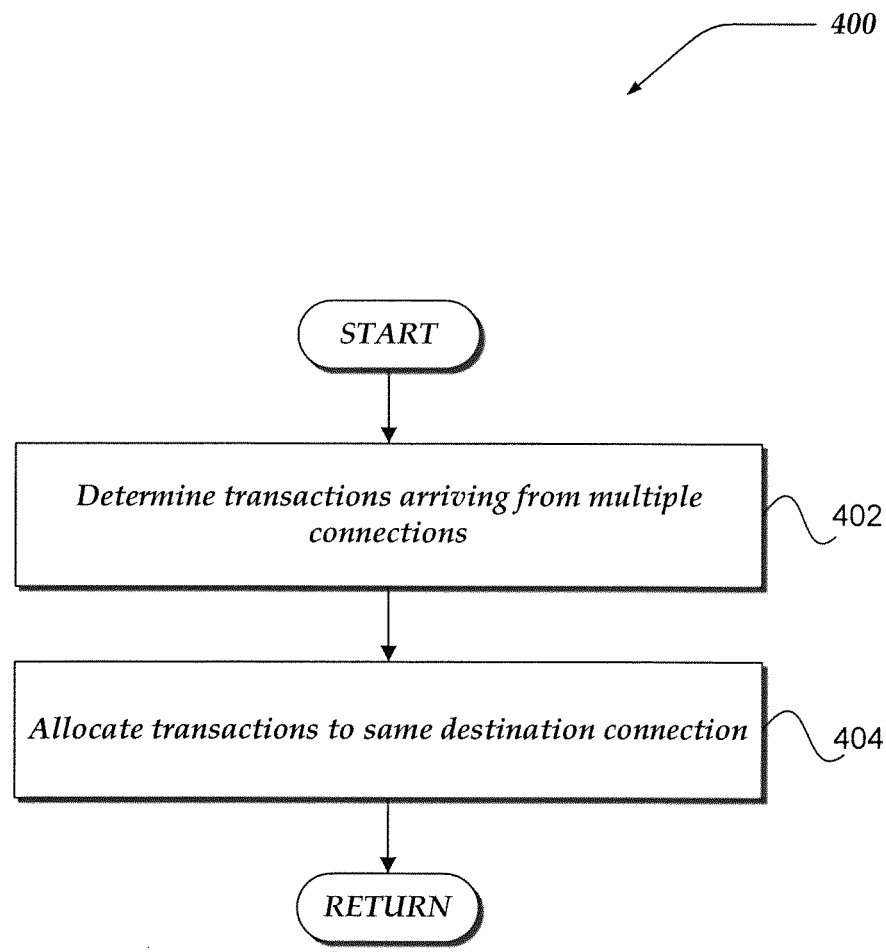
FIG. 4 illustrates a logical flow diagram generally showing a high-level view of one embodiment of a process for connection aggregation of network transactions.

The operation of certain aspects of the invention will now be described with respect to FIGS. 3-8. Aspects of the illustrated processes may be performed at an intermediate network device such as network device 200, and may be performed by traffic manager 218 as configured by traffic management rules interpreter 220, which performs operations specified in a script provided by a user to adapt connection splitting and/or connection aggregation to a particular protocol. FIG. 3 illustrates a logical flow diagram generally showing a high-level view of one embodiment of a process for connection splitting of network transactions. FIG. 4 illustrates a logical flow diagram generally showing a high-level view of one embodiment of a process for connection aggregation of network transactions. In general, the transactions include incoming requests sent by way of one client connection, or the like.

Turning to FIG. 3, process 300 begins, after a start block, at block 302, where data arriving from the connection is received. Processing next flows to block 304, at which transaction boundaries are determined. Process 300 next proceeds to block 306, at which transactions are split across one or more destination connections, which may be backend server connections. Depending on the features of the particular protocol, a transaction split may occur after a response to a first request has been processed. Processing then returns to a calling process to perform other actions.

As shown in FIG. 4, process 400 begins, after a start block, at block 402, at which transactions arriving from multiple connections are determined. Processing next flows to block 404, where multiple determined transactions are allocated to the same destination connection. Depending on the features of the particular protocol, the determination of a transaction may occur after a response to a first request has been processed. Process 400 then returns to a calling process to perform other actions.

Figure 5:
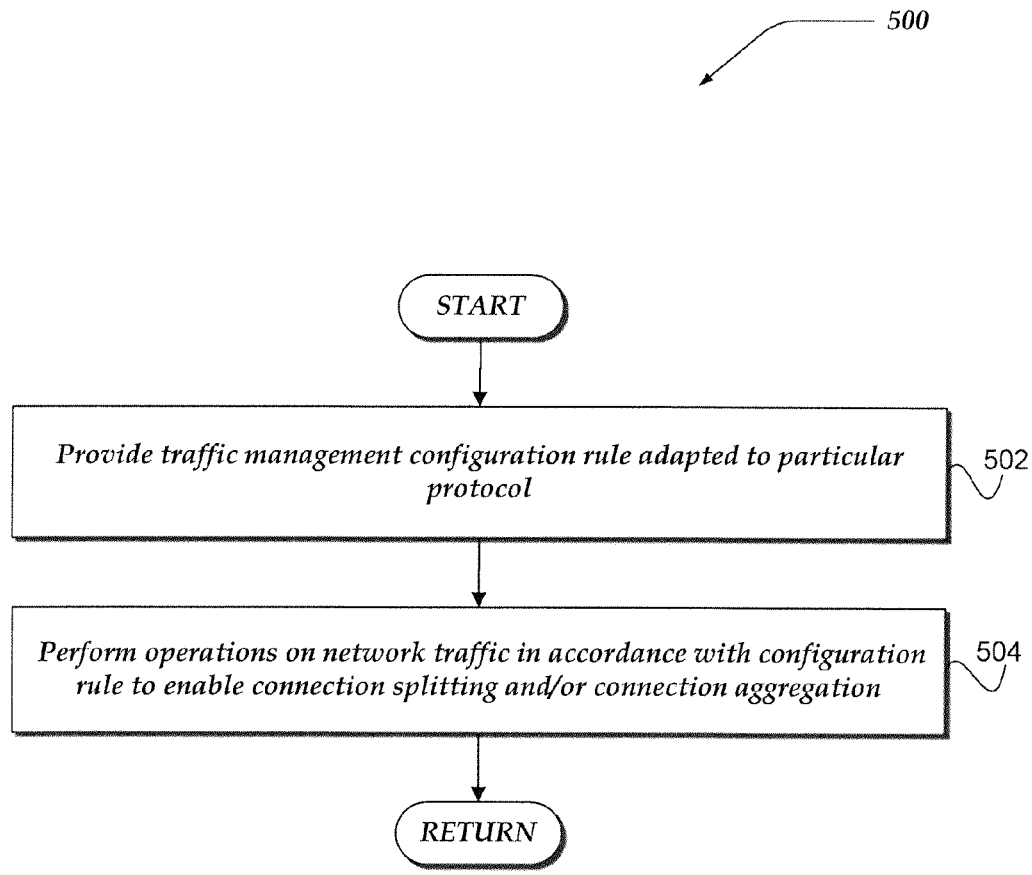
FIG. 5 is a logical flow diagram generally showing a high-level view of one embodiment of a process for configuring network traffic management to support connection splitting and/or connection aggregation for a particular protocol.

FIG. 5 is a logical flow diagram generally showing a high-level view of one embodiment of a process for configuring network traffic management to support connection splitting and/or connection aggregation for a particular protocol. Following a start block, process 500 begins at block 502, at which a traffic management rule is provided. The rule is adapted to the features and requirements of a particular protocol. The rule may be defined by way of a script that is provided to an interpreter, such as traffic management rules interpreter 220. Next, process 500 flows to block 504, where operations are performed on network traffic in accordance with the configuration rule to enable connection splitting and/or connection aggregation of network transactions. Processing then returns to a calling process to perform other actions.

Figure 6:
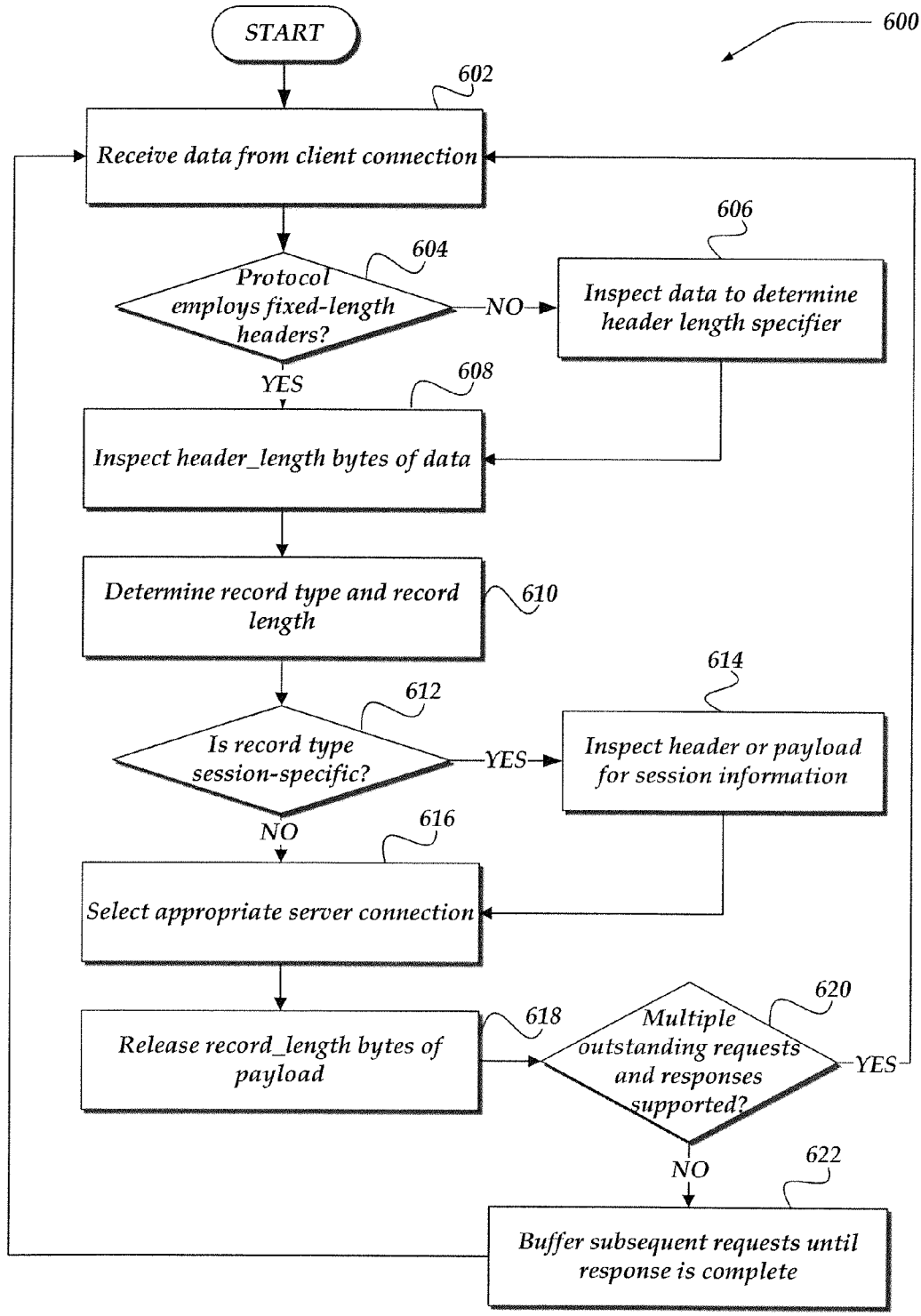
FIG. 6 illustrates a logical flow diagram generally showing one embodiment of a process for providing connection splitting for an arbitrary protocol, with respect to client requests.

FIG. 6 illustrates a logical flow diagram generally showing one embodiment of a process for providing connection splitting for an arbitrary protocol, with respect to client requests. Process 600 begins, after a start block, at block 602, where data is received from a client connection. Processing flows next to decision block 604, where a determination is made whether the protocol is one that is known to employ fixed-length headers. If not, processing branches to block 606; otherwise, processing proceeds directly to block 608. At block 606, received data, which may be stored in a buffer, is inspected to determine a header length specifier, after which process 600 steps to block 608.

At block 608, the header for the incoming request is examined by inspecting header_length bytes of the received data. If the header_length bytes are received in multiple segments, the received data is buffered until all the bytes are received. Processing then continues to block 610, where the record type and record length of the request are determined based on inspection of the header. Depending on the protocol, there may be many possible record types.

Process 600 next flows to decision block 612. In general, some records for a given protocol are session-specific. For a session-specific record, one particular backend server might have the information associated with the session, while other backend servers would not. Accordingly, at decision block 612, a determination is made whether the record type is session-specific. If not, processing steps directly to block 616. If, however, the record type is determined to be session-specific, process 600 branches to block 614, where additional inspection is performed on the header or, if necessary, the payload of the request to extract session-related information, after which processing advances to block 616.

At block 616, an appropriate server connection from among one or more server connections is selected. In some cases the appropriate server connection will already have been established. Otherwise, various considerations and criteria may be employed to select the server connection, including determining the currently least-loaded server, determining which server has the fewest connections, a round robin technique, the use of a weight or ratio, the use of an appropriate metric, or any other suitable criteria.

Process 600 continues to block 618, where record_length bytes of payload data are released from buffering and forwarded to the selected server connection. Next, processing advances to decision block 620, where a determination is made whether multiple outstanding requests and responses are supported by the protocol. If so, the process loops back to block 602 and receives further data. If, however, the protocol does not support multiple outstanding requests and responses, processing steps to block 622, where subsequent requests are buffered until a response to the processed request is completed. Alternatively, a subsequent request may be sent over a different backend connection; if in-order responses are required, the responses may be buffered as necessary. After the appropriate response is received and forwarded to the client, processing loops back to block 602 and process 600 receives additional data.

Figure 7:
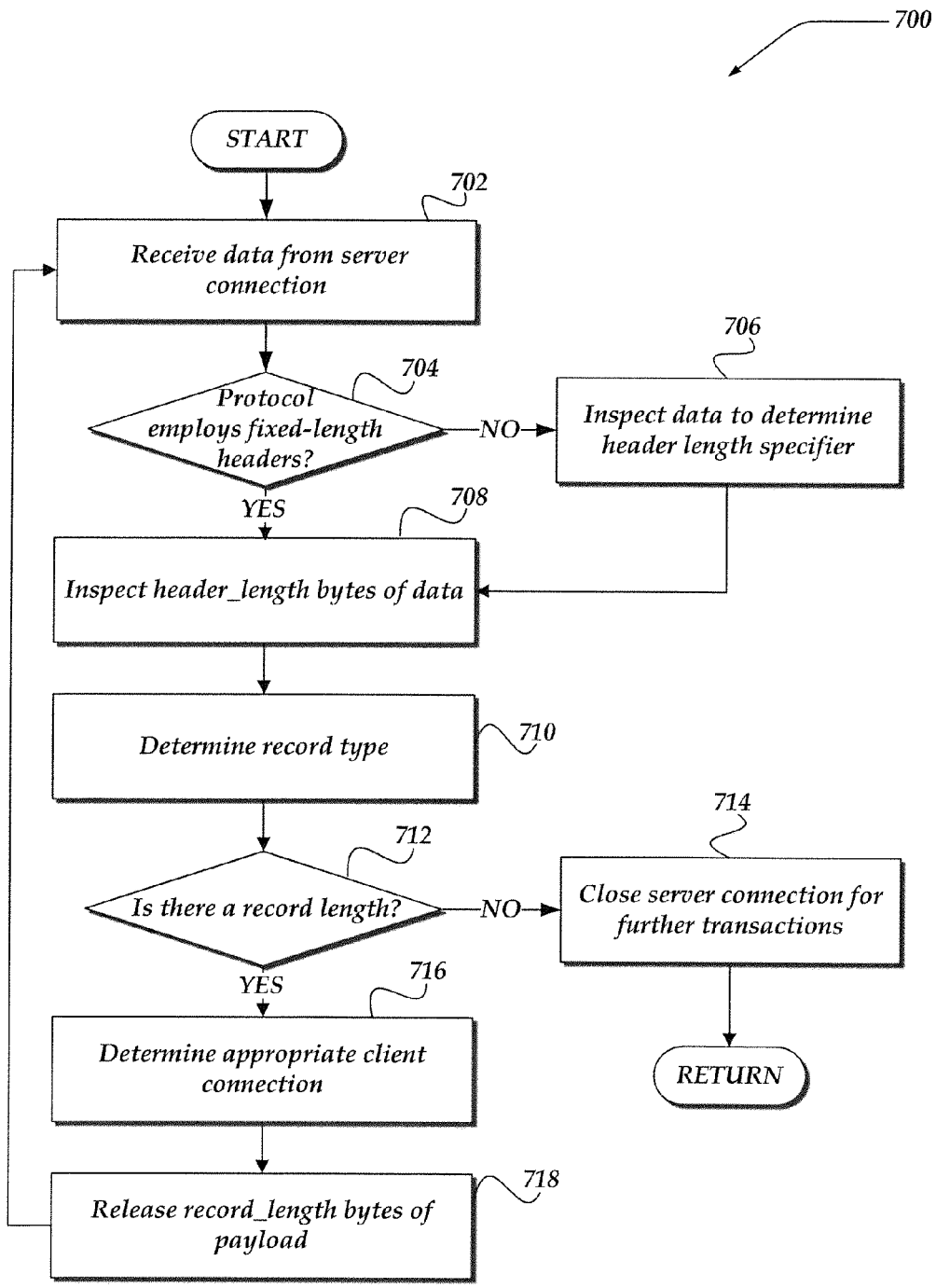
FIG. 7 illustrates a logical flow diagram generally showing one embodiment of a process for providing connection splitting for an arbitrary protocol, with respect to server responses.

FIG. 7 illustrates a logical flow diagram generally showing one embodiment of a process for providing connection splitting for an arbitrary protocol, with respect to server responses. In some respects, process 700 is symmetrical to the client request side of connection splitting illustrated in FIG. 6. Process 700 begins, after a start block, at block 702, where data is received from a server connection. Processing then flows to decision block 704, at which it is determined whether the protocol employs fixed-length headers. If so, process 700 steps directly to block 708. Otherwise, if the protocol does not or is not known to feature fixed-length headers, process 700 branches to block 706, at which received data is buffered and inspected to determine a header length specifier, after which processing flows to block 708.

At block 708, header_length bytes of data are inspected. Next, at block 710, the record type of the response is determined. Process 700 then flows to decision block 712, where it is determined whether there is a record length. If there is not a record length, the server connection will not be reused, and processing accordingly branches to block 714, at which the server connection is closed for further transactions. Processing then advances to a return block and performs other actions.

If the determination at decision block 712 is affirmative, process 700 flows to block 716, at which an appropriate client connection is determined for forwarding the server response. Processing then advances to block 718, where record_length bytes of the response payload are released to the determined client connection. Process 700 then loops back to block 702 to receive additional data from the same server connection.

Figure 8:
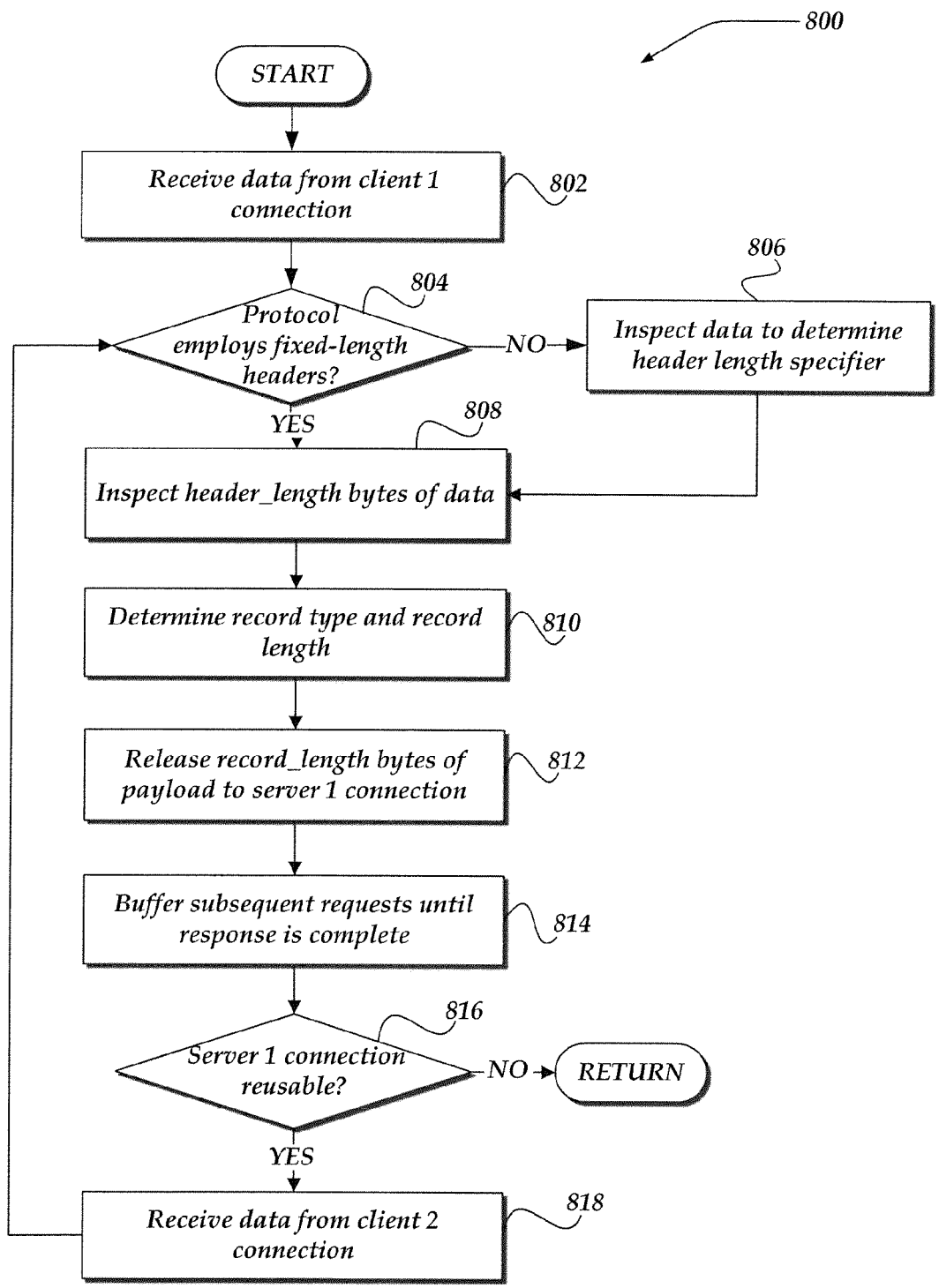
FIG. 8 illustrates a logical flow diagram generally showing one embodiment of a process for providing connection aggregation for an arbitrary protocol, in accordance with the invention.

FIG. 8 illustrates a logical flow diagram generally showing a simplified view of one embodiment of a process for providing connection aggregation for an arbitrary protocol. The process is similar to, albeit different from, the connection splitting process, and is simpler in some respects. Process 800 begins, after a start block, at block 802, where data is received from a connection for client 1. Processing then flows to decision block 804, where it is determined whether the protocol employs fixed-length headers. If so, process 800 steps to block 808. However, if the determination is negative, process 800 branches to block 806, where buffered data is inspected to determine a header length specifier, following which process 800 advances to block 808.

At block 808, header_length bytes of response data are inspected. Next, at block 810, the record type and record length are determined based on the inspected header. Processing then flows to block 812, at which record_length bytes of buffered payload data are released to a particular server connection (server 1). Process 800 then advances to block 814, where any subsequent requests from the first client connection are buffered until a server response is complete. Processing flows next to decision block 816, at which it is determined whether the connection for server 1 is reusable. For example, the connection to client 1 might now be closed, or subsequent requests from client 1 might be directed to a different server. If the server 1 connection is not reusable, process 800 flows to a return block and performs other actions. If, however, the server 1 connection can be reused, processing branches to block 818, where data is received from a connection for client 2. The process loops back to decision block 804, thus enabling the connection for server 1 to be reused by client 2.

It will be appreciated by those skilled in the art that the flow diagrams of FIGS. 6-8 are simplified for illustrative purposes. For example, processes such as those illustrated in these figures may have additional logic to handle transitions for error states, unexpected connection closures, early responses, and the like.

Example Rule

Presented below is an example of a rule definition that may be employed in an embodiment of the invention. The syntax of the rule is similar to that of iRules, which enable the configuration of a device in the BIG-IP® family of traffic management devices provided by F5 Networks, Inc. of Seattle, Wash. Further information on iRules is available at http://www.f5.com. The example rule specifies several event declarations which determine when aspects of the defined rule are evaluated. As presented, the rule provides load balancing of multiple client requests on one connection across multiple backend servers for an arbitrary TCP-based protocol.

```
rule oneconnect_rule {
   when CLIENT_ACCEPTED {
   TCP::collect
   set response_done 0
   }
   when CLIENT_DATA {
   # find the end of the request
   set index [string first "\n\n" [TCP::payload]]
   if {$index>0} {
      TCP::release [expr $index+2]
      TCP::notify request
   }
   }
   when SERVER_DATA {
   if {$response_done} {
      TCP::notify response
      set response_done 0
      TCP::collect
   }
   # find the end of the response
   set index [string first "\r\n\r\n" [TCP::payload]]
   set len 0
   if {$index>0} {
   # get the content length
   regexp {Content-Length:\s*(\d+)} [TCP::payload]→len
   # send up the headers
   TCP::release [expr $index+4]
   if {[TCP::offset]==$len} {
      # we already have the complete response
      TCP::release $len
      TCP::notify response
   }
   else {
      # skip the remaining data
      set len [expr $len-[TCP::offset]]
      TCP::release
      puts "skip $len"
      TCP::collect 0 $len
      set response_done 1
   }
   }
   }
   when USER_REQUEST {
   puts "USER_REQUEST"
   }
   when USER_RESPONSE {
   puts "USER_RESPONSE"
   LB::detach
   }
```

The above specification provides a complete description of the manufacture and use of the composition of the invention.

Since many embodiments of the invention can be made without departing from the spirit and scope of the invention, the invention resides in the claims hereinafter appended.

What is claimed as new and desired to be protected by Letters Patent of the United States is:

1. A network device, comprising:
   a memory device that stores an interpreter; and
   a processor configured to execute the interpreter and perform actions, including:
      receiving a configuration rule change adapted to a protocol that is foreign to the network device where the protocol is not natively supported by the network device without the configuration rule change to the network device;
      employing the configuration rule change to detect a boundary of a transaction in received traffic;
      inspecting one or more portions of the received traffic to determine a header length of the transaction, wherein the header length is employed to determine a header of the transaction;
      determining a record type and a record length that correspond to the transaction based on contents of the header;
      managing a connection splitting using the record type, the record length, and the detected boundary of the transaction to allocate two or more requests within the received traffic on a same input connection to two or more different backend servers having different backend server connections, wherein a destination backend server is chosen from among the two or more different backend servers based on at least the configuration rule change and at least one criteria for load-balancing the destination backend server; and
      reusing at least one connection to the two or more backend servers for a second client application when responses by the two or more backend servers to a first client application are complete.

2. The network device of claim 1, wherein the processor performs actions, further including:
   when a record type for the protocol is determined to be session-specific based on inspection of a protocol header record:
      extracting session-related information from the received traffic; and
      using the extracted session-related information in part to select one of the backend server connections.

3. The network device of claim 1, wherein the processor performs actions, further including:
   determining at least one requirement of the protocol based on an inspection of the received traffic in at least one request;
   when the protocol is determined to support multiple outstanding requests based on the at least one requirement, receiving additional traffic without waiting for a response to the at least one request; otherwise,
   buffering subsequent traffic requests until the response to the at least one request is completed.

4. The network device of claim 1, further comprising:
   receiving subsequent traffic from one of the different backend server connection;
   determining when there is a record length within a header of the subsequent traffic; and
   when the record length is undetected within the header of the subsequent traffic, closing the one backend server connection to any subsequent transaction.

5. The network device of claim 1, wherein the processor performs actions, further including:
   employing the configuration rule change to detect another boundary of another transaction; and
   further managing a multiple-client connection aggregation using the other detected boundary of the other transaction to direct two or more other requests from two or more different client devices to a same backend server connection to a particular backend server.

6. The network device of claim 5, wherein managing multiple-client connection aggregation further comprises sending a subsequent request from a first client device in the two or more client devices, to a different backend server connection based on a third detected boundary of a third transaction.

7. The network device of claim 1, wherein the protocol is an application-level protocol situated above a Transmission Control Protocol.

8. An apparatus comprising a non-transitory computer readable medium, having computer-executable instructions stored thereon, that in response to execution by a network device, cause the network device to perform operations, comprising:
   receiving a configuration rule change adapted to a protocol that is foreign to the network device where the protocol is not natively supported by the network device without the configuration rule change to the network device;
   employing the configuration rule change to detect a boundary of a transaction in received traffic;
   inspecting one or more portions of the received traffic to determine a header length of the transaction, wherein the header length is employed to determine a header of the transaction;
   determining a record type and a record length that correspond to the transaction based on contents of the header;
   managing a connection splitting using the record type, the record length, and the detected boundary of the transaction to allocate two or more requests within the received traffic on a same input connection to two or more different backend servers having different backend server connections, wherein a destination backend server is chosen from among the two or more different backend servers based on at least the configuration rule change and at least one criteria for load-balancing the destination backend server; and
   reusing at least one connection to the two or more backend servers for a second client application when responses by the two or more backend servers to a first client application are complete.

9. The apparatus of claim 8, wherein the network device performs actions, further including:
   when a record type for the protocol is determined to be session-specific based on inspection of a protocol header record:
      extracting session-related information from the received traffic; and
      using the extracted session-related information in part to select one of the backend server connections.

10. The apparatus of claim 8, wherein the network device performs actions, further including:
    determining at least one requirement of the protocol based on an inspection of the received traffic in at least one request;
    when the protocol is determined to support multiple outstanding requests based on the at least one requirement, receiving additional traffic without waiting for a response to the at least one request; otherwise,
    buffering subsequent traffic requests until the response to the at least one request is completed.

11. The apparatus of claim 8, further comprising:
    receiving subsequent traffic from one of the different backend server connections;

determining if there is a record length within a header of the subsequent traffic; and if the record length is undetected within the header of the subsequent traffic, closing the one backend server connection to any subsequent transactions.

12. The apparatus of claim 8, wherein the network device performs actions, further including:

employing the configuration rule change to detect an other boundary of an other transaction; and further managing a multiple-client connection aggregation using the other detected boundary of the other transaction to direct two or more other requests from two or more different client devices to a same backend server connection to a particular backend server.

13. The apparatus of claim 8, wherein the configuration rule change is defined using a scripting language that is evaluated at runtime upon an occurrence of a defined network event.

14. The apparatus of claim 8, wherein network device operates as a traffic management device that is interposed between one or more client devices and a plurality of backend servers.

15. A system, comprising:

a plurality of backend server devices having processors and arranged to receive requests and provide responses; and a network device having one or more processors that perform actions, including:

receiving a configuration rule change adapted to a protocol that is foreign to the network device where the protocol is not natively supported by the network device without the configuration rule change to the network device;

employing the configuration rule change to detect a boundary of a transaction in received traffic;

inspecting one or more portions of the received traffic to determine a header length of the transaction, wherein the header length is employed to determine a header of the transaction;

determining a record type and a record length that correspond to the transaction based on contents of the header;

managing a connection splitting using the record type, the record length, and the detected boundary of the transaction to allocate two or more requests within the received traffic on a same input connection to two or more different backend server devices in the plurality of server devices having different backend server connections, wherein a destination backend server is chosen from among the two or more different backend servers based on at least the configuration rule change and at least one criteria for load-balancing the destination backend server; and reusing at least one connection to the two or more backend servers for a second client application when responses by the two or more backend servers to a first client application are complete.

16. The system of claim 15, wherein the network device performs actions, further including:

when a record type for the protocol is determined to be session-specific based on inspection of a protocol header record:

extracting session-related information from the received traffic; and using the extracted session-related information in part to select one of the backend server connections.

17. The system of claim 15, wherein the network device performs actions, further including:

determining at least one requirement of the protocol based on an inspection of the received traffic in at least one request;

when the protocol is determined to support multiple outstanding requests based on the at least one requirement, receiving additional traffic without waiting for a response to the at least one request; otherwise, buffering subsequent traffic requests until the response to the at least one request is completed.

18. The system of claim 15, further comprising:

receiving subsequent traffic from one of the different backend server connections;

determining if there is a record length within a header of the subsequent traffic; and if the record length is undetected within the header of the subsequent traffic, closing the one backend server connection to any subsequent transactions.

19. The system of claim 15, wherein the network device performs actions, further including:

employing the configuration rule change to detect an other boundary of an other transaction; and further managing a multiple-client connection aggregation using the other detected boundary of the other transaction to direct two or more other requests from two or more different client devices to a same backend server connection to a particular backend server.

20. The system of claim 15, wherein the configuration rule change is defined using a scripting language that is evaluated at runtime upon an occurrence of a defined network event.

\* \* \* \* \*